United States Patent
Bassman et al.

(10) Patent No.: US 10,852,792 B2
(45) Date of Patent: Dec. 1, 2020

(54) SYSTEM AND METHOD FOR RECOVERY OF SIDEBAND INTERFACES FOR CONTROLLERS

(71) Applicant: Dell Products, L.P., Round Rock, TX (US)

(72) Inventors: Robert G. Bassman, The Hills, TX (US); Manjunath Vishwanath, Bangalore (IN); Andre James Dumouchelle, Austin, TX (US); Pavan Kumar Gavvala, Anantapur (IN); Rama Rao Bisa, Bangalore (IN); Johan Rahardjo, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 142 days.

(21) Appl. No.: 16/170,357

(22) Filed: Oct. 25, 2018

(65) Prior Publication Data

US 2020/0133355 A1 Apr. 30, 2020

(51) Int. Cl.
*G06F 1/20* (2006.01)
*G06F 1/24* (2006.01)
*G06F 13/40* (2006.01)
*G06F 9/4401* (2018.01)
*G06F 13/16* (2006.01)

(52) U.S. Cl.
CPC ............ *G06F 1/206* (2013.01); *G06F 1/24* (2013.01); *G06F 9/4403* (2013.01); *G06F 13/1668* (2013.01); *G06F 13/4027* (2013.01); *G06F 2213/0026* (2013.01)

(58) Field of Classification Search
None
See application file for complete search history.

(56) References Cited

U.S. PATENT DOCUMENTS

| 6,289,406 | B1 * | 9/2001 | Chambers | G06F 13/4027 370/402 |
| 2006/0004929 | A1 * | 1/2006 | Forrer, Jr. | G06F 13/385 710/15 |
| 2014/0281311 | A1 * | 9/2014 | Walker | G06F 12/122 711/162 |
| 2016/0357701 | A1 * | 12/2016 | Lee | G06F 11/0745 |

\* cited by examiner

*Primary Examiner* — Fahmida Rahman
(74) *Attorney, Agent, or Firm* — Fogarty LLP

(57) ABSTRACT

Periods of interoperability of sideband buses prevent effective management of managed devices by a remote access controller. Embodiments avoid periods of inoperability of sideband buses and recover the sideband bus without resetting the managed devices or the IHS (Information Handling System). The remote access controller configures timer and transmits the timer to a managed device. The managed device monitors the sideband for messages for the remote access controller. If no messages are received before expiration of the timer, the managed device resets its sideband bus endpoint, without resetting the managed device.

20 Claims, 4 Drawing Sheets

SYSTEM AND METHOD FOR RECOVERY OF SIDEBAND INTERFACES FOR CONTROLLERS

FIELD

The present disclosure generally relates to Information Handling Systems (IHSs), and, more particularly, to the management of interfaces and devices that comprise IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may utilize buses to communicate signals, such as transmitting data, between components of the IHS. If a bus connecting two components of the IHS become unavailable, communications between the two components may be completely disabled. In scenarios where a bus becomes inoperable, bus communications may be resumed by restarting the components. However, restarting these components may render them inoperable and may require restarting the IHS. In certain scenarios, such restart requirements may be infeasible. For instance, sideband (i.e., out-of-band) management buses used for monitoring a component may become inoperable, but restarting the monitored component in order to restart such a sideband bus is greatly disfavored in scenarios where such restarts result in downtime of services supported by the component, and potentially the IHS.

Components of an IHS generate significant amounts of heat. Heat within an IHS may degrade the reliability and performance of IHS components, possibly resulting in costly malfunctions and component failures. In order to dissipate generated heat, an IHS may include a cooling fan, or a plurality of cooling fans organized within an airflow cooling system. Various components within the IHS may be outfitted with sensors that monitor operating temperatures at various locations in the system. Based on temperature readings provided by such sensors and communicated via buses, corresponding cooling fan adjustments can be made.

An IHS airflow cooling system may utilize open-loop control or closed-loop control in order to determine fan speed settings for the one or more cooling fans that are available to the cooling system of the IHS. Closed-loop control systems typically utilize collected temperature information, such as collected by sensors within the IHS, to determine cooling fan settings. Open-loop control systems, on the other hand, do not utilize collected temperature data and instead rely on preset fan speed configurations, such as a thermal table. In certain scenarios, closed-loop systems may revert to less efficient open-loop cooling when temperature data from sensors is unavailable. However, in scenarios where sensor data is unavailable due to failures in the bus used to communicate with the sensors, fail-over operations by cooling systems may require setting the cooling fans to a safe, but unnecessarily high, fan speed setting, and in some cases to a maximum fan speed setting.

SUMMARY

In various embodiments, a system is provided for managing a plurality of managed devices via a sideband bus. The system includes: a remote access controller configured to: configure, for a first managed device of the plurality of managed devices, a first timer to expire after a first duration; transmit a timer command to the first managed device via the sideband bus, wherein the timer command specifies the first timer; the first managed device coupled to the remote access controller via the sideband bus, wherein the first managed device comprises a sideband bus monitor configured to: start a first timer for the first duration based on receipt of the timer command from the remote access controller; monitor the sideband bus for communications from the remote access controller; if a communication is detected from the remote access controller prior to the expiration of the first duration, restart the first timer; and if no communication from the remote access controller is detected prior to the expiration of the first duration, reset the sideband bus without restarting the first managed device.

In certain addition system embodiments, the first duration is selected for the first timer by the remote access controller based on whether the first managed device provides temperature sensor readings. In certain addition system embodiments, the first managed device is a host bus adapter coupled to a plurality of storage devices. In certain addition system embodiments, the remote access controller is further configured to transmit, via the sideband bus, a temperature request to the host bus adapter on a periodic interval. In certain addition system embodiments, the host bus adapter forwards the temperature request to the plurality of storage devices and relays temperature sensor readings from the plurality of storage devices to the remote access controller via the sideband bus. In certain addition system embodiments, the remote access controller is further configured to determine a second duration until the host bus adapter resets the sideband bus, if the remote access controller does not receive the temperature sensor readings before the beginning of the next periodic interval. In certain addition system embodiments, the remote access controller is further configured to signal fail-over cooling if the temperature sensor readings are not received prior to the expiration of the second duration.

In various additional embodiments, a method is provided for managing a plurality of managed devices via a sideband bus. The method includes: configuring, by a remote access controller, a first timer for a first managed device of the plurality of managed devices, wherein the first timer is configured to expire after a first duration; transmit a timer command from the remote access controller to the first managed device via the sideband bus, wherein the timer command specifies the first timer configuration; starting, by a sideband bus monitor of the first managed device, a first timer for the first duration based on receipt of the timer command from the remote access controller; monitoring the sideband bus for communications from the remote access controller; restarting the first timer, if a communication is detected from the remote access controller prior to the expiration of the first duration, and reset the sideband bus without restarting the first managed device, if no communication from the remote access controller is detected prior to the expiration of the first duration.

In certain addition method embodiments, the first duration is selected for the first timer by the remote access controller based on whether the first managed device provides temperature sensor readings. In certain addition method embodiments, the first managed device is a host bus adapter coupled to a plurality of storage devices. In certain addition embodiments, the method further includes transmitting, by the remote access controller via the sideband bus, a temperature request to the host bus adapter on a periodic interval. In certain addition embodiments, the method further includes forwarding, by the host bus adapter, the temperature request to the plurality of storage devices; and relaying, by the host bus adapter via the sideband bus, temperature sensor readings from the plurality of storage devices to the remote access controller. In certain addition embodiments, the method further includes if the remote access controller does not receive the temperature sensor readings before the beginning of the next periodic interval, determining, by the remote access controller, a second duration until the host bus adapter resets the sideband bus. In certain addition embodiments, the method further includes signaling, by the remote access controller, fail-over cooling if the temperature sensor readings are not received prior to the expiration of the second duration.

In additional embodiments, an Information Handling System (IHS) includes a remote access controller configured to: configure, for a first managed device, a first timer to expire after a first duration; transmit a timer command to the first managed device via a sideband bus, wherein the timer command specifies the first timer configuration; the first managed device coupled to the remote access controller via the sideband bus, wherein the first managed device comprises a sideband bus monitor configured to: start a first timer for the first duration based on receipt of the timer command from the remote access controller; monitor the sideband bus for communications from the remote access controller; if a communication is detected from the remote access controller prior to the expiration of the first duration, restart the first timer; and if no communication from the remote access controller is detected prior to the expiration of the first duration, reset the sideband bus without restarting the IHS.

In certain addition IHS embodiments, the first duration is selected for the first timer by the remote access controller based on whether the first managed device provides temperature sensor readings. In certain addition IHS embodiments, the IHS further includes a plurality of storage devices, wherein the first managed device is a host bus adapter coupled to the plurality of storage device, and wherein the remote access controller is further configured to transmit, via the sideband bus, a temperature request to the host bus adapter on a periodic interval. In certain addition IHS embodiments, the host bus adapter forwards the temperature request to the plurality of storage devices and relays temperature sensor readings from the plurality of storage devices to the remote access controller via the sideband bus. In certain addition IHS embodiments, the remote access controller is further configured to determine a second duration until the host bus adapter resets the sideband bus, if the remote access controller does not receive the temperature sensor readings before the beginning of the next periodic interval. In certain addition IHS embodiments, the remote access controller is further configured to signal fail-over cooling if the temperature sensor readings are not received prior to the expiration of the second duration.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Remote management of IHSs supports the centralized administration of virtualized systems that are configured from these remotely managed IHSs. Remote management of an IHS may be implemented using components such as the remote access controller described herein that monitors various aspects of the operation of the IHS. Such monitoring may be implemented using sideband bus communications between the remote access controller and components of the IHS being managed by the remote access controller. Periods of interoperability of such sideband buses may prevent effective management of the IHS by the remote access controller. Embodiments described herein avoid periods of prolonged inoperability of such sideband buses and provide techniques for recovering the sideband bus without resetting the managed components or the IHS.

Figure 1:
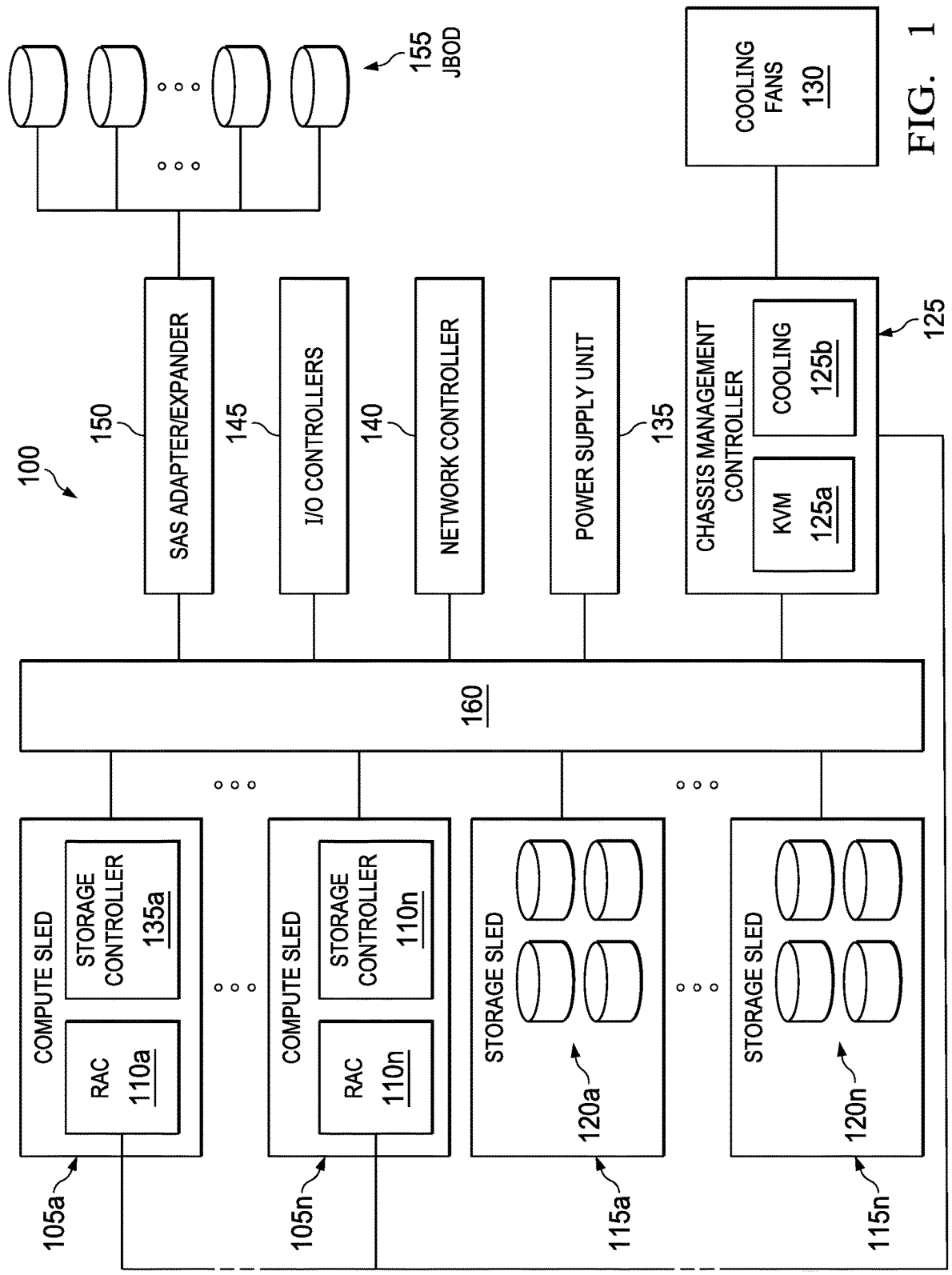
FIG. 1 is a diagram illustrating certain components of a chassis, according to some embodiments that includes a plurality of IHSs configured for managing devices of the IHSs via sideband buses.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n are individually coupled to chassis 100 via connectors that physically and electrically couple an individual sled to a backplane 160 and correspond to the bays provided by the chassis 100. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
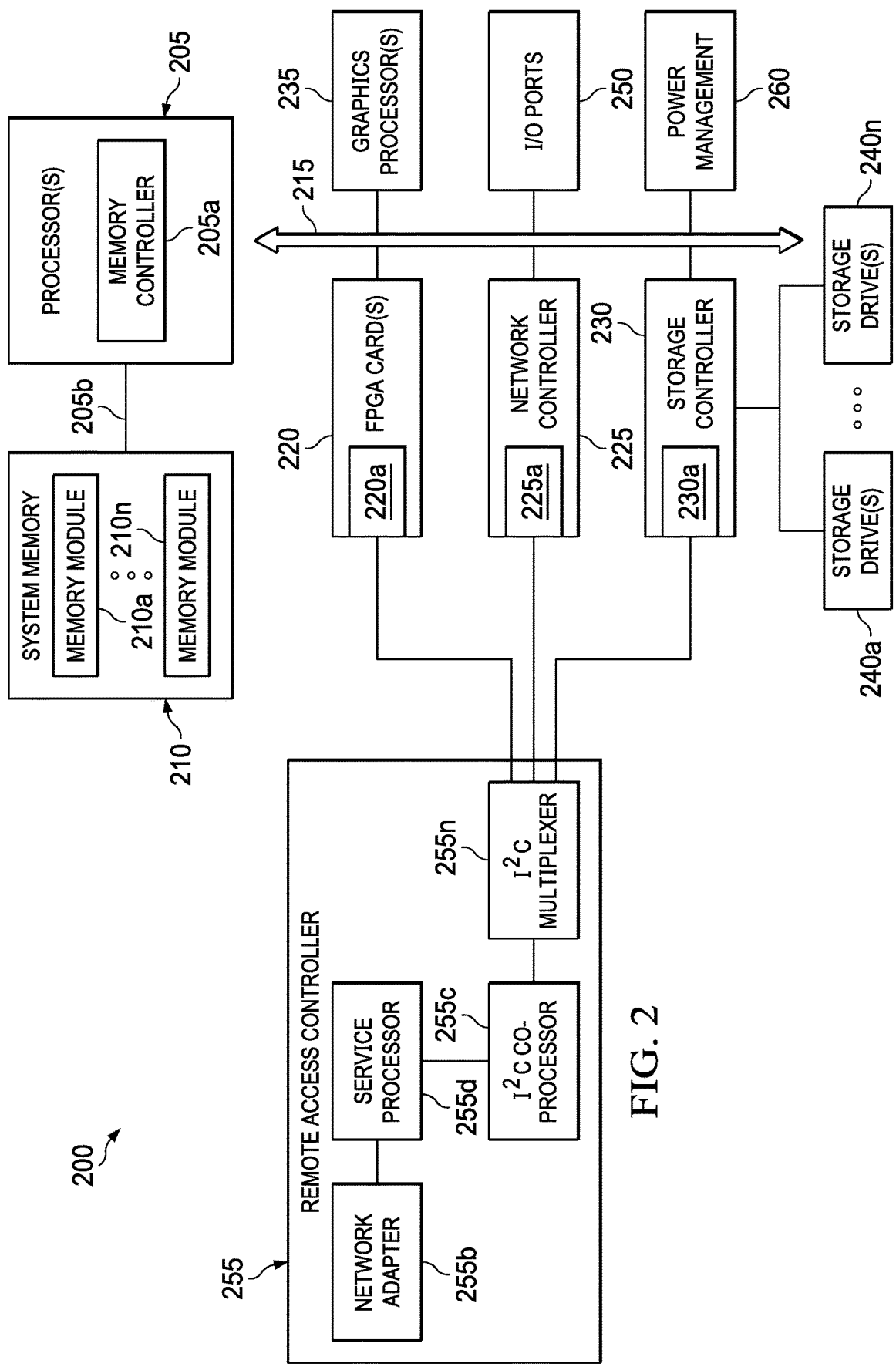
FIG. 2 is diagram illustrating certain components of an IHS configured, according to some embodiments, for managing a plurality of managed devices via a sideband bus.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provides as high-availability systems that operate with minimum downtime. As described in additional detail with regard to FIG. 2, compute sleds 105a-n may be configured for general-purpose computing tasks or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. As described in additional detail with regard to the below embodiments, remote access controller 110a-n may collect sensor data, such as temperature sensor readings, from components of the chassis 100 in support of maintaining close-loop airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

Each of the compute sleds 105a-n includes a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface directly with the chassis 100.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

As described in additional detail with regard to the below embodiments, chassis management controller 125 may be configured to support closed-loop airflow cooling for chassis 100 based on temperature sensor readings collected by the individual remote access controllers 110a-n. As illustrated, the chassis management controller 125 may utilize a direct communication pathway with the remote access controllers 110a-n comprised within the respective compute sleds 105a-n, where this direct communication pathway is independent of the communication pathways supported by backplane 160.

The airflow cooling system provided by a rack may consist of one or more fans that may be controlled by the airflow cooling module 125b of the chassis management controller 125. The chassis management controller 125 may control the fans of the airflow cooling system based on temperature sensor readings collected by the remoted access controllers. In this manner, the chassis management controller 125 may support airflow cooling for the IHSs installed within chasses 100.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with virtually any type of IHS. In the illustrative embodiment of FIG. 2, IHS 200 may be a computing component, such as compute sled 105a-n, that is configured to share infrastructure resources provided by a chassis, such as chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a root complex. IHS 200 may also include one or more I/O ports 250, such as PCIe ports, that may be used to couple the IHS 200 directly to other IHSs, storage resources or other components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

As described with regard to FIG. 1, IHS 200 may include a storage controller 230, that may be a host bus adapter (HBA) that may provide IHS 200 with access to any number of storage drives 240a-n. A host bus adapter is a storage controller 230 that may provide access to physical (i.e., non-virtualized) storage drives 240a-n, and may thus support a limited set of storage functions. Accordingly, an HBA may not include support for data redundancy or disk virtualization techniques, such as certain RAID functions. Accordingly, the host bus adapter 230 provides access to physical storage drives 240a-n, but provides limited support for management functions, such as certain functions performed by the remote access controller 255. In particular, the host bus adapter 230 does not collect or monitor temperatures for the storage drives 240a-n that it provides access to. As described in additional detail with regard to FIG. 4, in some embodiments, the remote access controller 255 may be configured to collect temperature readings for the storage drives 240a-n via commands that are relayed by the host bus adapter 230 in order to support closed-loop airflow cooling of the IHS 200.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255d or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225b may support connections with remote access controller 255 with wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

The service processor 255d may rely on an I2C co-processor to implement the I2C communications between the remote access controller 255 and the managed components of the IHS. The I2C co-processor 255c may be a specialized co-processor or micro-controller that is configured to interface via a sideband I2C bus interface with the managed hardware components of the IHS 200, such as FPGA cards 220, network controller 225 and storage controller 230 that are coupled to the IHS processor(s) 205 via an in-line bus, such as a PCIe root complex. In certain embodiments, the I2C co-processor 225c may be configured to implement techniques described with regard to FIGS. 3 and 4 for recovery of an inoperable sideband device management bus.

As illustrated, the I2C co-processor 255c may interface with the individual managed devices 220, 225 and 230 via a sideband buses selected through the operation of an I2C multiplexer 255a. Such I2C buses are prone to becoming frozen in an inoperable state due to various types of malfunctions, errors and spurious conditions. The I2C co-processor 255c may ensure recovery of the sideband buses through configuration of a sideband bus timer implemented in conjunction with sideband bus monitors 220a, 225a, 230a that are implemented on the respective managed devices and described in additional detail with regard to FIGS. 3 and 4.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
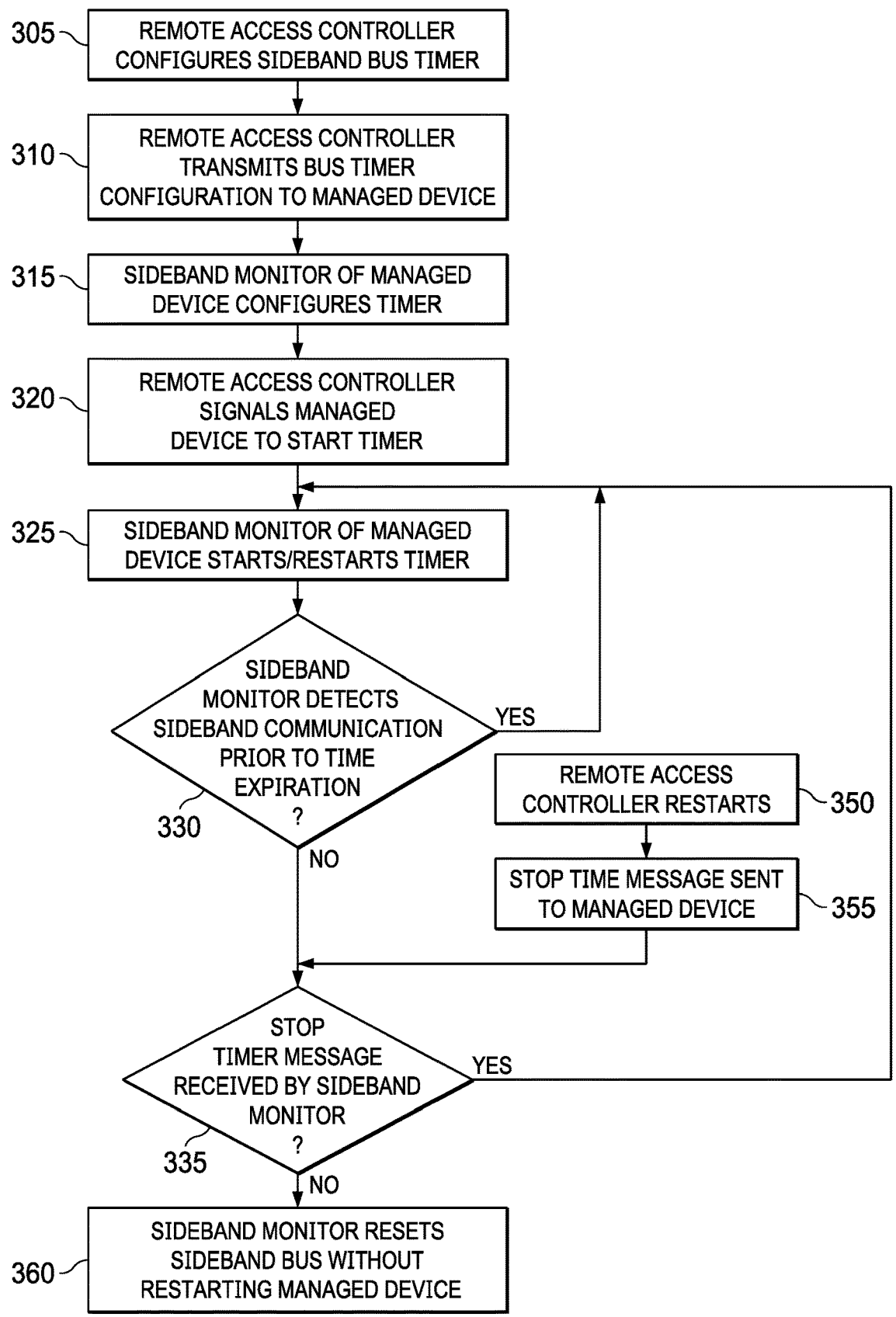
FIG. 3 is a flowchart describing certain steps of a method, according to some embodiments, for managing, by a remote access controller, a plurality of managed devices coupled to the remote access controller via a sideband bus.

FIG. 3 is a flowchart describing certain steps of a method, according to some embodiments, for managing a plurality of devices coupled to a remote access controller via a sideband bus. As described, a bus may become inoperable due to a variety of different causes. If a sideband bus used to manage a device becomes inoperable, restarting the managed device in order to reinitialize the sideband bus is possible, but highly disfavored due to the resulting downtime by the managed device, and potentially downtime in services provided by the IHS in which the managed device is installed.

The embodiment illustrated in FIG. 3 begins at step 305 with the configuration of a timer by the remote access controller, where the timer is configured for use in monitoring and management of a sideband bus by which one or more managed components of an IHS are coupled to the remote access controller, and by which the remote access controller manages the components. In some embodiments, the timer may be configured for use by a specific managed device in monitoring the sideband bus by which the managed device is coupled to the remote access controller.

For instance, the duration of the timer may be selected based on the relative importance of the data that is provided by the managed device to the remote access controller via the sideband bus. As described, one of the functions of the remote access controller is the collection of temperature sensor readings for use in supporting closed-loop airflow cooling. Also as described, the lack of temperature sensor readings may result in reverting to failover, open-loop airflow cooling. Accordingly, in some embodiments, the duration of the timer configured at step 305 may be selected based on whether the managed component provides temperature sensor readings. For instance, a shorter duration may be specified for timers for managed components that provide temperature sensor readings, and longer durations may be specified for other types of managed components. A shorter duration for such timers results in shorter intervals of interoperability of a sideband bus before the bus is reset by a managed device, as described in additional detail below, such that the sideband bus is again available for transmission of temperature sensor readings.

At step 310, the remote access controller transmits a timer configuration to the managed device for which the timer has been configured. The timer configuration is transmitted to managed device via the sideband interface. At step 315, the managed device receives the timer configuration via the sideband bus and initializes a sideband bus timer that is set according to the duration specified by the remote access controller. In certain embodiments, a sideband monitor of the device, such as described with regard to FIG. 2, may monitor the sideband bus for timer configuration transmission and configure the corresponding timer on the managed device.

The remote access controller may issue a command, at step 320, signaling the managed device to start the configured timer. This start timer command is issued via the sideband bus that connects the managed device to the remote access controller. The remote access controller may log the time of the timer start command as the most recent communication with the managed device. At step 325, the sideband monitor of the managed device receives the start timer command and begins a countdown of the initialized sideband bus timer configured according to the duration specified by the remote access controller, thus initiating operations for monitoring and recovery of the sideband bus by the managed device.

Upon beginning countdown of the sideband bus timer by the sideband bus monitor of the managed device, the sideband bus monitor begins tracking the status of the sideband bus by monitoring for any communications from the remote access controller via the sideband bus. The sideband monitor may track the time of the most recent successful sideband bus communication from the remote access controller. If, at step 330, the sideband monitor detects a communication on the sideband bus from the remote access controller prior to the expiration of the sideband bus timer, the sideband monitor restarts the sideband bus timer and resumes monitoring the sideband bus for communications from the remote access controller.

If, at step 330, the sideband monitor determines that no communications have been received from the remote access controller via the sideband bus and the sideband bus timer has expired, the sideband bus may be presumed to be in an inoperable state. In certain embodiments, the remote access controller may be configured to issue periodic commands via the sideband bus, such as the temperature sensor request described with regard to FIG. 4, where the time interval between such periodic commands is selected to be shorter than the duration of the sideband bus timer. In certain scenarios, however, a lack of communications from the remote access controller may be due to certain functions of the remote access controller.

For instance, reset of the remote access controller, at step 350, may result in a period of inactivity on the sideband bus that is longer than the duration of the sideband bus timer, even though the sideband bus remains operable. In other embodiments, other functions of the remote access controller may similarly result in expected periods of inactivity on the sideband bus. In such scenarios, at step 355, the remote access controller may issue a stop timer command via the sideband bus.

Upon detecting a period of inactivity longer than the duration of the sideband bus timer, at step 335, the sideband monitor determines whether a stop timer command has been received. If a stop timer command has been received, the sideband monitor may restart the sideband bus timer and continue monitoring the sideband bus for communications from the remote access controller. If no stop timer command has been received, the sideband bus is presumed inoperable by the sideband bus monitor.

At step 360, the sideband bus monitor resets the sideband bus. In certain embodiments, the sideband bus may be reset by the bus monitor without affecting the operations of the managed component, and thus without affecting the operations of the IHS. Some embodiments may reset the sideband bus without requiring a power cycle by the managed component, or the IHS. The services provided by the IHS may thus be unaffected by the resetting of the sideband bus by the bus monitor. In some embodiments, the sideband bus monitor may reset the sideband bus by resetting the state of the I2C controller utilized by the managed device. In certain embodiments, the sideband bus monitor may reset the sideband bus by discharging the circuitry of the I2C controller utilized by the managed device or by trigging a sequence of logic signals in the sideband bus, thus signaling the resetting of the bus to the remote access controller.

Figure 4:
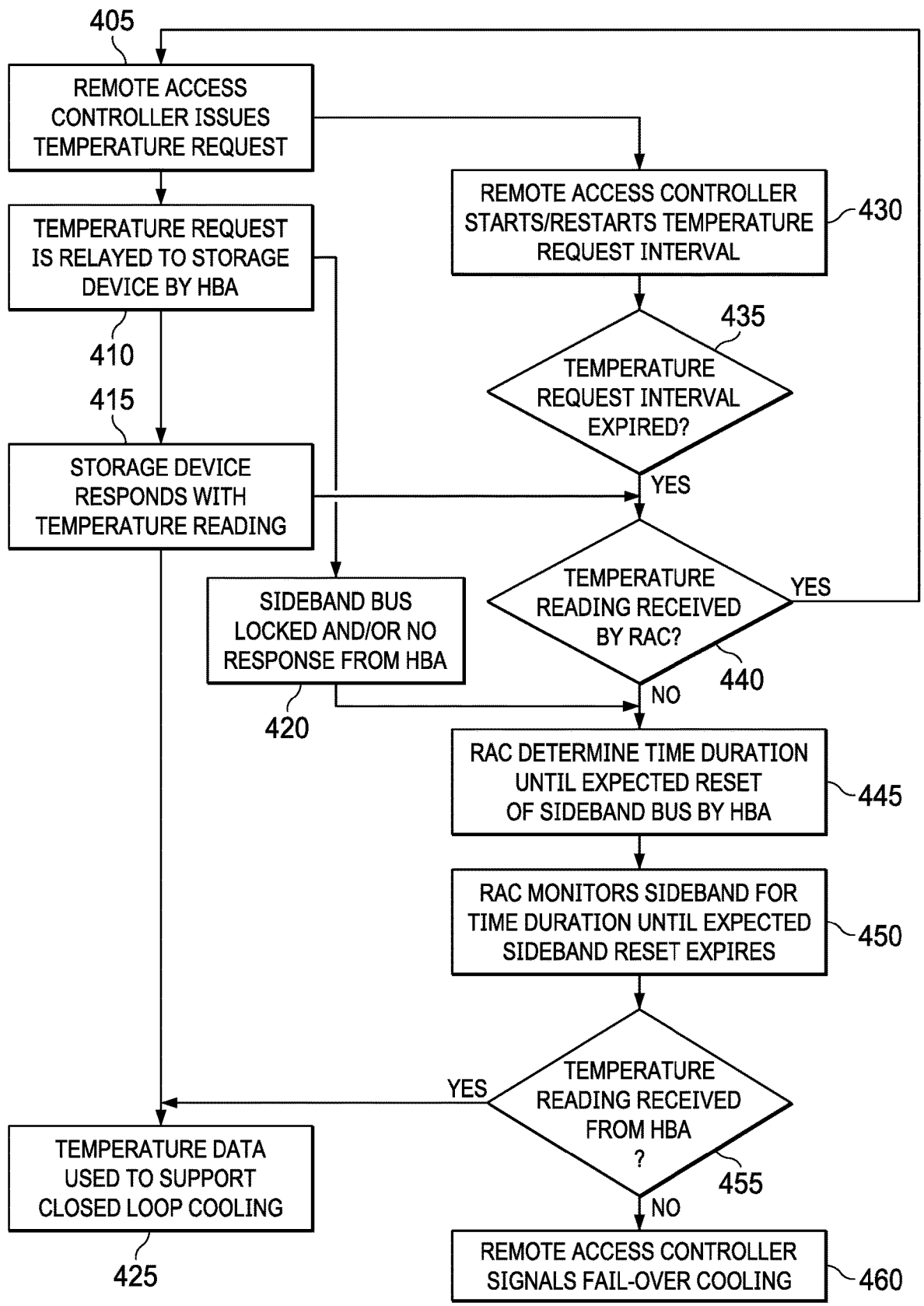
FIG. 4 is a flowchart describing certain steps of a method, according to some embodiments, for managing, by a remote access controller, utilizing temperature sensor readings from managed devices in scenarios where the sideband bus used to transmit the temperature sensor readings may be inoperable.

As described, periods where a sideband bus is inoperable may result in a lack of temperature sensor readings required to support closed-loop cooling of an IHS. FIG. 4 is a flowchart describing certain steps of a method, according to some embodiments, for utilizing, by a remote access controller, temperature sensor readings from managed devices in scenarios where the sideband bus used to transmit the temperature sensor readings may be inoperable in order to facilitate recovery of the sideband bus without restarting the managed device. The embodiment of FIG. 4 may begin at step 405 with the remote access controller issuing a request for temperature sensor readings to a managed device via a sideband bus that is managed according to the procedures described with regard to FIG. 3.

In the embodiment of FIG. 4, the managed device receiving the temperature sensor request is a host bus adapter (HBA), such as described with regard to FIGS. 1 and 2. As a storage controller without temperature collection or monitoring capabilities, the request for temperature sensor readings issued to the host bus adapter is configured as a pass-through sideband bus command that, at step 410, is relayed by the host adapter to the storage devices that are coupled to the host adapter. At step 415, the storage devices respond by capturing temperature sensor readings and transmitting the readings to the remote access controller via the host bus adapter.

As illustrated, at step 430, the remote access controller may start a countdown of a temperature request interval upon issuing a temperature request via the sideband bus. In support of closed-loop cooling operations by an IHS, the remote access controller collects temperature sensor readings at regular intervals. The length of such intervals may be selected to be less than the duration of the sideband bus timer used by the host bus adapter in managing the sideband bus according to the procedure described with regard to FIG. 3. Selected in this manner, the temperature sensor requests are regular communications that should be received by the sideband bus monitor as long as the sideband bus remains operable, thus triggering the sideband bus monitor to reset the sideband bus timer and deferring a reset of the sideband bus.

If, at step 435, the countdown of the temperature request interval expires, at step 440, the remote access controller determines whether temperature sensor readings have been received in response to the remote access controller's prior temperature sensor request. If the temperature sensor readings were relayed to the remote access controller by the host bus adapter, the remote access controller returns to step 405 and issue another temperature sensor request to the host bus adapter.

If the requested temperature sensor readings are not received by the remote access controller upon expiration of the request interval, at step 445 the remote access controller may determine the time duration until an expected reset of the sideband bus by the host bus adapter. Since no temperature sensor readings have been received, the sideband bus is presumably inoperable and the sideband bus monitor will reset the sideband bus based on the sideband bus timer configured by the remote access controller, as described with regard to FIG. 3. As described, the last known successful transmission, such as the temperature sensor request, via the sideband bus may be logged by the remote access controller.

In some embodiments, the time of the last known successful transmission via the sideband bus may be used to determine the period of inactivity on the sideband bus. Based on the duration of the sideband bus timer relative to the determined period of activity, the expected duration until a reset of the sideband bus by the HBA may be calculated. At step 450, the remote access controller monitors the sideband interface for a reset signal from the HBA until the expected remaining reset duration expires. If, at step 455, if no reset signal or no temperature sensor readings are received from the HBA, the remote access controller signals failover cooling operations at step 460. As described, such failover cooling operations may result in open-loop cooling by an IHS such as the compute nodes of FIGS. 1 and 2, as well as by the chassis and rack in which the compute node is installed. Embodiments such as described with regard to FIG. 4 provide a technique for delaying such failover cooling operations to allow for resetting of a sideband bus used to collect temperature sensor readings, as described regard to FIG. 3.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for managing a plurality of managed devices via a sideband bus, the system comprising:
   a remote access controller configured to:
      configure, for a first managed device of the plurality of managed devices, a first timer to expire after a first duration;
      transmit a timer command to the first managed device via the sideband bus, wherein the timer command specifies the first timer;
      transmit temperature requests to the first managed device via the sideband bus at periodic intervals;
   the first managed device coupled to the remote access controller via the sideband bus, wherein the first managed device comprises a sideband bus monitor configured to:
      start a first timer for the first duration based on receipt of the timer command from the remote access controller;
      monitor the sideband bus for the temperature requests from the remote access controller;

if a temperature request from the remote access controller is detected prior to the expiration of the first duration, restart the first timer and report collected temperature sensor readings to the remote access controller; and
if no temperature request from the remote access controller is detected prior to the expiration of the first duration, reset the sideband bus without restarting the first managed device; and
wherein the remote access controller is further configured to determine a second duration until the first managed device resets the sideband bus, if the remote access controller does not receive the temperature sensor readings before beginning a next periodic interval.

2. The system of claim 1, wherein the first duration is selected for the first timer by the remote access controller to be greater than the periodic interval at which temperature requests are transmitted by the remote access controller.

3. The system of claim 1, wherein the first managed device is a host bus adapter coupled to a plurality of storage devices.

4. The system of claim 3, wherein, in response to the detection of a temperature request prior to the expiration of the first duration by the host bus adapter on a periodic, the host bus adapter collects the temperature sensor readings from the plurality of storage devices.

5. The system of claim 4, wherein the host bus adapter relays the temperature sensor readings from the plurality of storage devices to the remote access controller via the sideband bus.

6. The system of claim 1, wherein the remote access controller is further configured to signal closed-loop cooling using the temperature sensor readings from the first managed device if the temperature sensor readings are received prior to the expiration of the second duration.

7. The system of claim 1, wherein the remote access controller is further configured to signal fail-over cooling if the temperature sensor readings are not received prior to the expiration of the second duration.

8. A method for managing a plurality of managed devices via a sideband bus, the method comprising:
configuring, by a remote access controller, a first timer for a first managed device of the plurality of managed devices, wherein the first timer is configured to expire after a first duration;
transmit a timer command from the remote access controller to the first managed device via the sideband bus, wherein the timer command specifies the first timer configuration;
transmit temperature requests to the first managed device via the sideband bus at periodic intervals;
starting, by a sideband bus monitor of the first managed device, the first timer for the first duration based on receipt of the timer command from the remote access controller;
monitoring the sideband bus for the temperature requests communications from the remote access controller;
restarting the first timer and reporting collected temperature sensor readings to the remote access controller, if a temperature request from the remote access controller is detected prior to the expiration of the first duration, and
reset the sideband bus without restarting the first managed device, if no temperature request from the remote access controller is detected prior to the expiration of the first duration;
detecting that the remote access controller does not receive the temperature sensor readings before beginning a next periodic interval; and
responsive to the detecting, determining, by the remote access controller, a second duration until reset of the sideband bus by the first managed device.

9. The method of claim 8, wherein the first duration is selected for the first timer by the remote access controller to be greater than the periodic interval at which temperature requests are transmitted by the remote access controller.

10. The method of claim 8, wherein the first managed device is a host bus adapter coupled to a plurality of storage devices.

11. The method of claim 10, further comprising:
collecting, by the host bus adapter in response to the detection of a temperature request prior to the expiration of the first duration, the temperature sensor readings from the plurality of storage devices.

12. The method of claim 11, further comprising:
relaying, by the host bus adapter via the sideband bus, the temperature sensor readings from the plurality of storage devices to the remote access controller.

13. The method of claim 8, further comprising:
signaling, by the remote access controller, closed-loop cooling using the temperature sensor readings from the first managed device if the temperature sensor readings are received prior to the expiration of the second duration.

14. The method of claim 8, further comprising:
signaling, by the remote access controller, fail-over cooling if the temperature sensor readings are not received prior to the expiration of the second duration.

15. An Information Handling System (IHS) comprising:
a remote access controller configured to:
configure, for a first managed device, a first timer to expire after a first duration;
transmit a timer command to the first managed device via a sideband bus, wherein the timer command specifies the first timer configuration;
transmit temperature requests to the first managed device via the sideband bus at periodic intervals;
the first managed device coupled to the remote access controller via the sideband bus, wherein the first managed device comprises a sideband bus monitor configured to:
start a first timer for the first duration based on receipt of the timer command from the remote access controller;
monitor the sideband bus for the temperature requests from the remote access controller;
if a temperature request from the remote access controller is detected prior to the expiration of the first duration, restart the first timer and report collected temperature sensor readings to the remote access controller; and
if no temperature request from the remote access controller is detected prior to the expiration of the first duration, reset the sideband bus without restarting the IHS, and
wherein the remote access controller is further configured to determine a second duration until the first managed device resets the sideband bus, if the remote access controller does not receive the temperature sensor readings before beginning a next periodic interval.

16. The IHS of claim 15, wherein the first duration is selected for the first timer by the remote access controller to be greater than the periodic interval at which temperature requests are transmitted by the remote access controller.

17. The IHS of claim 16, further comprising:
a plurality of storage devices, wherein the first managed device is a host bus adapter coupled to the plurality of storage device.

18. The IHS of claim 17, wherein the host bus adapter relays temperature sensor readings from the plurality of storage devices to the remote access controller via the sideband bus.

19. The IHS of claim 18, wherein the remote access controller is further configured to signal closed-loop cooling using the temperature sensor readings from the first managed device if the temperature sensor readings are received prior to the expiration of the second duration.

20. The IHS of claim 15, wherein the remote access controller is further configured to signal fail-over cooling if the temperature sensor readings are not received prior to the expiration of the second duration.

* * * * *